United States Patent
Wayne et al.

(10) Patent No.: US 10,635,755 B2
(45) Date of Patent: Apr. 28, 2020

(54) METHOD AND SYSTEM FOR OPTIMIZING THE CONFIGURATION OF A SOLAR POWER SYSTEM

(75) Inventors: Gary Wayne, Berkeley, CA (US); Billy Hinners, San Rafael, CA (US)

(73) Assignee: Sunrun, Inc., San Francisco, CA (US)

( * ) Notice: Subject to any disclaimer, the term of this patent is extended or adjusted under 35 U.S.C. 154(b) by 0 days.

(21) Appl. No.: 13/327,549

(22) Filed: Dec. 15, 2011

(65) Prior Publication Data

US 2013/0158954 A1    Jun. 20, 2013

(51) Int. Cl.
  G06F 17/10    (2006.01)
  G06F 17/50    (2006.01)

(52) U.S. Cl.
  CPC .......... G06F 17/50 (2013.01); G06F 2217/78 (2013.01); Y02E 60/76 (2013.01); Y04S 40/22 (2013.01)

(58) Field of Classification Search
  None
  See application file for complete search history.

(56) References Cited

U.S. PATENT DOCUMENTS

| | | | | |
|---|---|---|---|---|
| 8,476,523 B2 * | 7/2013 | Bennett | ...................... | E04D 1/30 136/251 |
| 8,826,163 B1 * | 9/2014 | Chanin | ............... | G06F 3/04842 703/1 |
| 2009/0066357 A1 * | 3/2009 | Fornage | .................. | H02J 3/383 324/764.01 |
| 2009/0178668 A1 * | 7/2009 | Boggavarapu | .......... | F03D 9/007 126/601 |
| 2010/0217566 A1 * | 8/2010 | Wayne | ................ | G06F 17/5004 703/1 |
| 2010/0217724 A1 * | 8/2010 | Wayne | ................ | G06F 17/5004 705/348 |
| 2011/0049992 A1 * | 3/2011 | Sant'Anselmo | ........ | H02S 10/10 307/64 |
| 2011/0106654 A1 * | 5/2011 | Lee | ......................... | G06Q 10/06 705/26.8 |
| 2011/0148452 A1 * | 6/2011 | Cherukupalli | .... | H01L 31/02021 324/761.01 |
| 2011/0205245 A1 * | 8/2011 | Kennedy | ................ | G06Q 10/10 345/636 |
| 2012/0205974 A1 * | 8/2012 | McCaslin | ............... | H02J 3/385 307/18 |
| 2012/0310427 A1 * | 12/2012 | Williams | .................. | G05F 1/67 700/287 |
| 2013/0246010 A1 * | 9/2013 | Dershowitz | ........... | H01L 31/042 703/1 |

* cited by examiner

*Primary Examiner* — Rehana Perveen
*Assistant Examiner* — Cuong V Luu
(74) *Attorney, Agent, or Firm* — Kramer Levin Naftalis & Frankel LLP

(57) ABSTRACT

An optimization engine determines the optimal configuration for a solar power system by simulating the performance of different solar module arrays projected onto a target surface. The optimization engine selects the optimally-performing solar module array and then simulates the performance of additional solar module subarrays projected onto various regions of the target surface not already covered by the optimally-performing solar module array. The optimal configuration includes the optimally-performing solar module array and one or more optimally-performing solar module subarrays.

21 Claims, 15 Drawing Sheets

METHOD AND SYSTEM FOR OPTIMIZING THE CONFIGURATION OF A SOLAR POWER SYSTEM

BACKGROUND OF THE INVENTION

Field of the Invention

The present invention generally relates to solar power systems and more specifically to a method and system for optimizing the configuration of a solar power system.

Description of the Related Art

Solar power systems have provided a source of renewable energy for decades. A typical solar power system includes a set of solar panels that may be installed on a variety of target surfaces, such as, e.g., the roof of a residence. Prior to installation, a designer must configure the solar power system by determining the placement and the type of solar panels to be installed on the target surface. Once the configuration of the solar power system is determined, a set of solar panels may be physically mounted to the target surface according to that configuration.

One problem with the conventional installation process described above is that typical designers may have limited knowledge of solar power systems, and, thus, may not determine a configuration that results in optimal performance of the solar power system. This problem is compounded by the fact that solar power system performance is notoriously non-linear, and, thus, very sensitive to shading. Consequently, even small changes in solar panel shading from the desired placement may cause the performance of the solar power system to decrease dramatically. Furthermore, configuring solar power systems manually is both time-consuming and expensive.

Accordingly, what is needed in the art is an improved technique for configuring a solar power system.

SUMMARY OF THE INVENTION

Embodiments of the invention include a computer-implemented method for determining a configuration of a solar power system, including projecting a first plurality of solar module arrays onto a target surface, identifying a first solar module array within the first plurality of solar module arrays that has an optimal performance estimate relative to the other solar module arrays in the first plurality of a solar module arrays, projecting a first plurality of solar module subarrays onto regions of the target surface not covered by the first solar module array, and identifying a first solar module subarray within the first plurality of solar module subarrays that has an optimal performance estimate relative to the other solar module subarrays in the first plurality of solar module subarrays, where the configuration of the solar power system comprises at least the first solar module array and the first solar module subarray.

Advantageously, an optimized configuration of solar modules can be programmatically identified for use within a solar power system to be installed on a given target surface, thereby greatly improving the potential performance of that solar power system. Furthermore, since the method is computer-implemented, the configuration process is significantly more expedient and less costly than traditional manually-performed techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
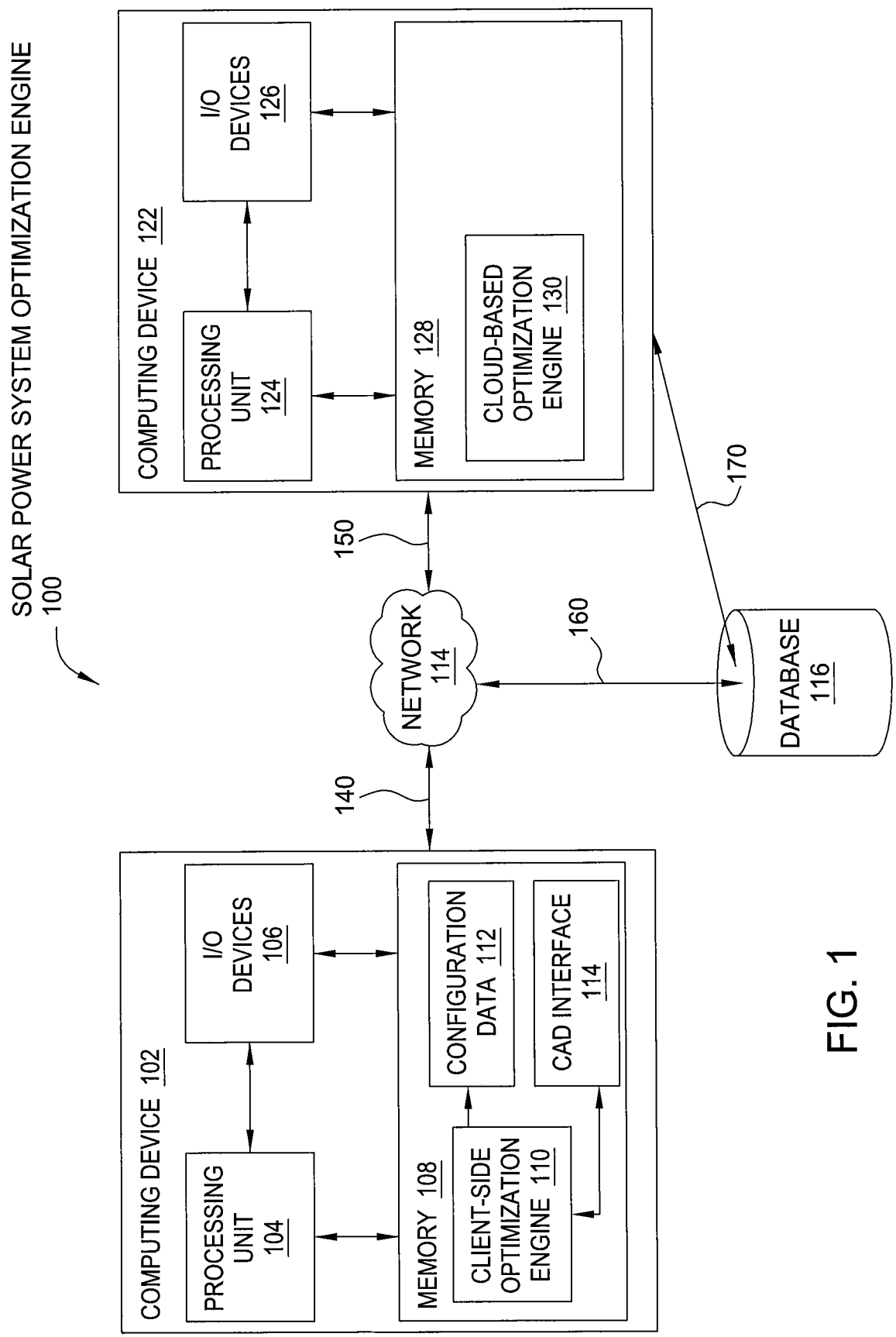
FIG. 1 is a block diagram illustrating a computer system configured to implement one or more aspects of the present invention.

FIG. 1 is a block diagram illustrating a solar power system optimization engine 100 configured to implement one or more aspects of the present invention. As shown, solar power system optimization engine 100, referred to hereinafter simply as "optimization engine 100," includes a computing device 102, a computing device 122, and a database 116 coupled together by a network 114. Network 114 could be any type of network, such as, e.g., the Internet or the World Wide Web.

Computing device 102 and computing device 122 are configured to exchange data across network 114 via communication paths 140 and 150. Computing device 102 may also read data from or write data to database 116 across network 114 via communication paths 140 and 160. Likewise, computing device 122 may read data from or write data to database 116 across network 114 via communication paths 150 and 160 or, alternatively, directly via communication path 170. Communication paths 140, 150, 160 and 170 may each be implemented as a wireless communication path, a wired communication path, or any other technically feasible type of communication path capable of transporting data.

As further described below and in conjunction with FIGS. 2-15, computing device 102 and computing device 122 are configured to cooperate to determine an optimized configuration for a solar power system. The optimized configuration includes a placement of one or more solar modules as well as a selection of one or more types of solar modules to be used. A solar module could be, for example, a photovoltaic (PV) solar panel.

An "optimized" configuration refers to any configuration that maximizes or minimizes a given performance metric. For example, the performance metric could be levelized cost of electricity (LCOE), and the optimized configuration would thus be the configuration with the lowest LCOE compared to other possible configurations. In another example, the performance metric could be estimated gross annual revenue, and the optimized configuration would thus be the configuration with the highest estimated gross annual revenue compared to other possible configurations. Persons skilled in the art will understand that any reasonable performance metric could be used to identify the optimized solar power system configuration.

When determining the optimized solar power system configuration, computing devices 102 and/or 122 access database 116 in order to extract data that describes a target installation location for the solar power system. Computing devices 102 and/or 122 then analyze the extracted data and determine the physical placement of various arrays of solar modules within the solar power system and the orientation of the solar modules within those arrays. Computing devices 102 and/or 122 also select one or more module types to be used within the arrays.

In one embodiment, computing device 102 operates as a client device and computing device 122 operates as a cloud-based device. In this embodiment, computing device 102 causes computing device 122 to perform the majority of the processing operations involved with determining the optimized configuration for the solar power system. Persons skilled in the art will recognize that computing device 102 and computing device 122 may distribute the processing tasks involved with determining the optimized configuration based on any technically feasible load-balancing algorithm. Those skilled in the art will also understand that either of computing devices 102 or 122 may perform all of the disclosed functionality of the present invention independently, i.e. without being coupled to another computing device, in a non-distributed manner. In such situations, the computing device performing the disclosed functionality may be a desktop computing device, laptop computing device, handheld computing device, and so forth.

Computing device 102 includes a processing unit 104 that is configured to perform various processing tasks and is coupled to input/output (I/O) devices 106 and to a memory 108. As shown, I/O devices 106 are also coupled to memory 108. Processing unit 104 may include one or more central processing unit (CPUs), parallel processing unit (PPUs), graphics processing unit (GPUs), application-specific integrated circuit (ASICs), field-programmable gate arrays (FPGAs), or any other type of processing unit capable of processing data. In addition, processing unit 104 may include various combinations of processing units, such as, e.g., a CPU coupled to a GPU. In on embodiment, computing device 102 is a mobile computing device, such as, e.g., a cell phone or tablet computing device.

I/O devices 106 may include input devices, such as a keyboard, a mouse, a touchpad, a microphone, a video camera, and so forth. I/O devices 106 may also include output devices, such as a screen, a speaker, a printer, and so forth. In addition, I/O devices 106 may include devices capable of performing both input and output operations, such as a touch screen, an Ethernet port, a universal serial bus (USB) port, a serial port, etc. I/O devices 106, as well as processing unit 104 described above, are both configured to read data from and write data to memory 108.

Memory 108 may include a hard disk, one or more random access memory (RAM) modules, a compact disc (CD) residing within a CD drive, a zip disk, and so forth. Persons skilled in the art will understand that memory 108 could be implemented as any technically feasible unit capable of storing data. Memory 108 includes a client-side optimization engine 110, configuration data 112, and a client-side computer-aided design (CAD) interface 114.

Client side optimization engine 110 is a software program that includes a set of program instructions capable of being executed by processing unit 104. When executed by processing unit 104, client-side optimization engine 110 configures processing unit 104 to participate in determining an optimized configuration for the solar power system to be installed on the target surface, as mentioned above. In doing so, client-side optimization engine 110 may cooperate with a corresponding software program within computing device 122, a cloud-based optimization engine 130, described below, in order to determine (i) the placement of solar modules on the target surface and (ii) a selection of solar module type to be used. Client-side optimization engine 110 cooperates with cloud-based optimization engine 130 in order to generate configuration data 112 that specifies the placement of the solar modules on the target surface and the selection of solar module type to be used.

Computing device 122 may be substantially similar to computing device 130 and includes a processing unit 124 that is configured to perform various processing tasks. Processing unit 122 is coupled to I/O devices 126 and to a memory 128. As shown, I/O devices 126 are also coupled to memory 128. Processing unit 124 may be substantially similar to processing unit 104 included within computing device 102, and, thus, may include one or more CPUs, PPUs, GPUs, ASICs, FPGAs, as well as various combinations of processing components, such as, e.g., a CPU coupled to a GPU.

I/O devices 126 may be substantially similar to I/O devices 106 included within computing device 102, and, thus, may include input devices, such as a keyboard, a mouse, a touchpad, a microphone, a video camera, and so forth, output devices, such as a screen, a speaker, a printer, and so forth, as well as devices capable of performing both input and output operations, such as a touch screen, an Ethernet port, a USB port, a serial port, etc. I/O devices 126, as well as processing unit 124 described above, are both configured to read data from and write data to memory 128.

Memory 128 may be substantially similar to memory 108 included within computing device 102, and, thus, may include a hard disk, one or more RAM modules, a CD residing within a CD drive, a zip disk, and so forth. Persons skilled in the art will understand that memory 128 could be implemented by any technically feasible unit capable of storing data. Memory 128 includes a cloud-based optimization engine 130.

Cloud-based optimization engine 130 is a software program that includes a set of program instructions capable of being executed by processing unit 124. When executed by processing unit 124, cloud-based optimization engine 130 configures processing unit 124 to cooperate with client-side optimization engine 110, described above, in determining the optimized configuration for the solar power system. In doing so, cloud-based optimization engine 130 and/or client-side optimization engine 110 are configured to extract data that describes the target installation location from database 116 and then process that data.

Database 116 may be a computer system executing a database program, such as, e.g. MySQL or postgreSQL, or may also be a cloud-based service configured to provide data based on requests transmitted by remote computer systems, such as, e.g. Google Earth®, Bing™ Maps, Pictometry® Online for geocoded RGB imagery, Digital Surface Models and Digital Elevation Models and Clean Power Research's Clean Power Estimator® for utility electricity tariffs and local, state and federal incentives. In one embodiment, database 116 is included within computing device 122 or computing device 102 or, alternatively, distributed between computing devices 102 and 122. Database 116 includes geospatial data that may describe target installation locations suitable for solar power systems to be installed. For example, database 116 could include a set of aerial or satellite photographs of three-dimensional (3D) structures, Digital Surface Models or Digital Elevation Models. Each of these could be used to identify land surfaces, structures suitable for solar power installations and to identify shading of those facilities. Database 116 may also include one or more 3D models representing 3D structures and obstructions, like trees, that might cast shadows on the solar array. In one embodiment, the 3D models are generated from a set of aerial or satellite photographs.

Client side optimization engine 110 and cloud-based optimization engine 130 are configured to extract the geospatial data from database 116 and to analyze a portion of that data corresponding to a particular physical location. The physical location could be represented by, e.g., a street address or geospatial positioning system (GPS) coordinates, among others. Based on that analysis, client side optimization engine 110 and cloud-based optimization engine 130 generate an optimized solar power system configuration, as described above. In practice, client side optimization engine 110 within computing device 102 and cloud-based optimization engine 130 within computing device 122 work in conjunction with one another when generating the optimized solar power system configuration. Accordingly, for the sake of simplicity, the remainder of this description will simply describe the optimization engine 100, which includes computing devices 102 and 122, as performing the various steps involved with generating the optimized solar power system configuration.

FIGS. 2-11 are conceptual diagrams that each illustrates a different step in the process of determining the optimized solar power system configuration, according to one embodiment of the present invention. Persons skilled in the art will understand that the conceptual diagrams described below in conjunction with FIGS. 2-11 are provided for exemplary purposes only, and should in no way limit the scope of the present invention. Additionally, those skilled in the art will recognize that any reasonable application of the techniques described conceptually below falls within the scope of the present invention.

Figure 2:
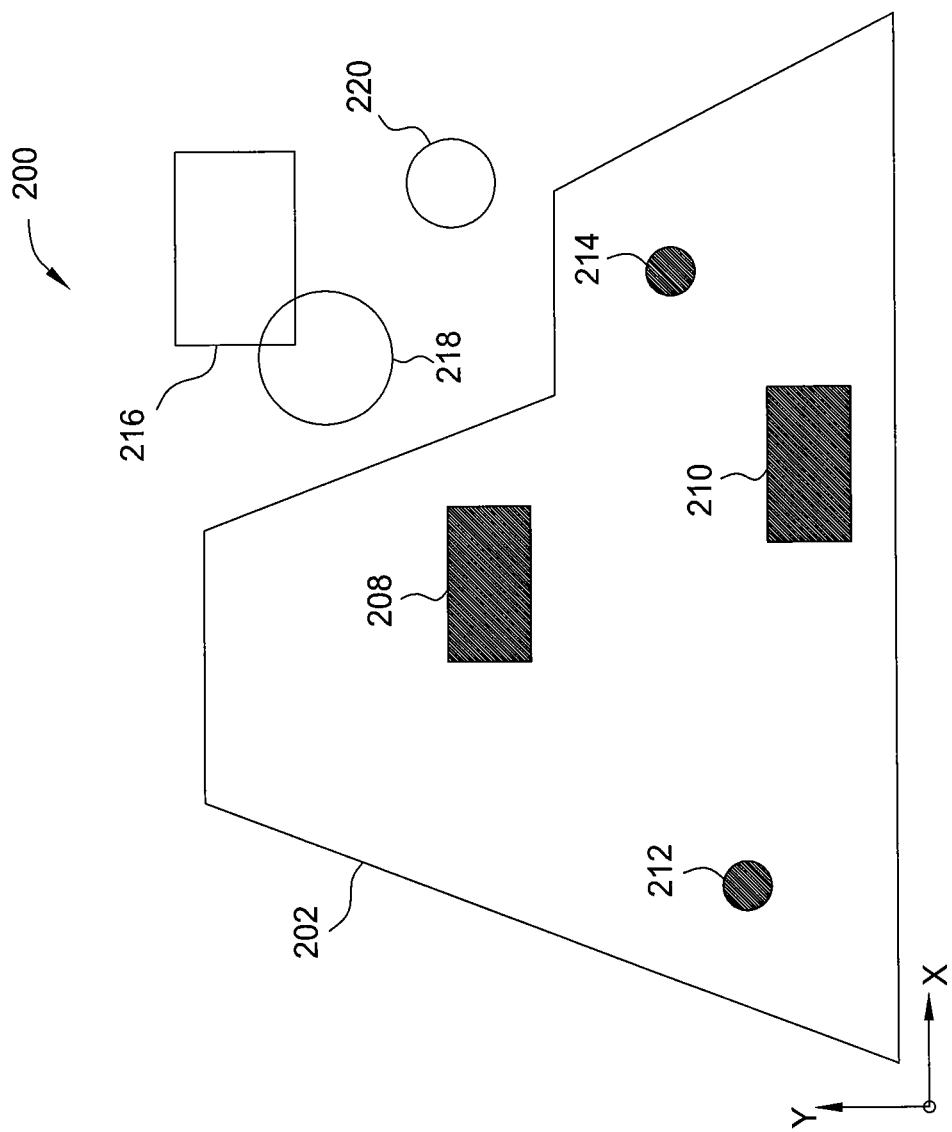
FIGS. 2-11 are conceptual diagrams each illustrating a different step in a process for determining an optimized solar power system configuration, according to one embodiment of the present invention.

FIG. 2 is a conceptual diagram 200 that includes a target surface 202. Target surface 202 may represent a portion of the geospatial data describing the target installation location extracted from database 116 by optimization engine 100 or manually constructed through CAD interface 114. In the exemplary embodiment shown in FIG. 2, target surface 202 represents the roof of a house. Target surface 202 could be a two-dimensional (2D) surface represented by a set of X-Y coordinates, a 3D surface represented by a set of X-Y-Z coordinates, or a set of vector equations that represent the various lines that make up target surface 202, among other representations. Persons skilled in the art will recognize that target surface 202 may be represented using any technically feasible data structure.

As shown, target surface 202 includes obstructions 208, 210, 212, and 214. Obstructions 208 and 210 could be, e.g. skylights, while obstructions 212 and 214 could be, e.g., stovepipes. In addition, the site may include structures 216 and trees 218 and 220 external to target surface 202. In general, obstructions 208, 210, 212, 214, 218 and 220 represent regions unsuitable for the placement of solar modules. In one embodiment, optimization engine 100 identifies obstructions 208, 210, 212, 214, 218, and 220 based on the geospatial data extracted from database 116. In another embodiment, the geospatial data includes indications of various obstructions generated via CAD interface 114 in conjunction with client-side optimization engine 110. Once target surface 202 has been identified from within the geospatial data extracted from database 116 or constructed by a user via CAD interface 114 in conjunction with client-side optimization engine 110, optimization engine 100 projects a tiling grid onto target surface 202 in order to estimate a performance metric associated with various locations on target surface 202, as described below in conjunction with FIGS. 3-6.

Figure 3:
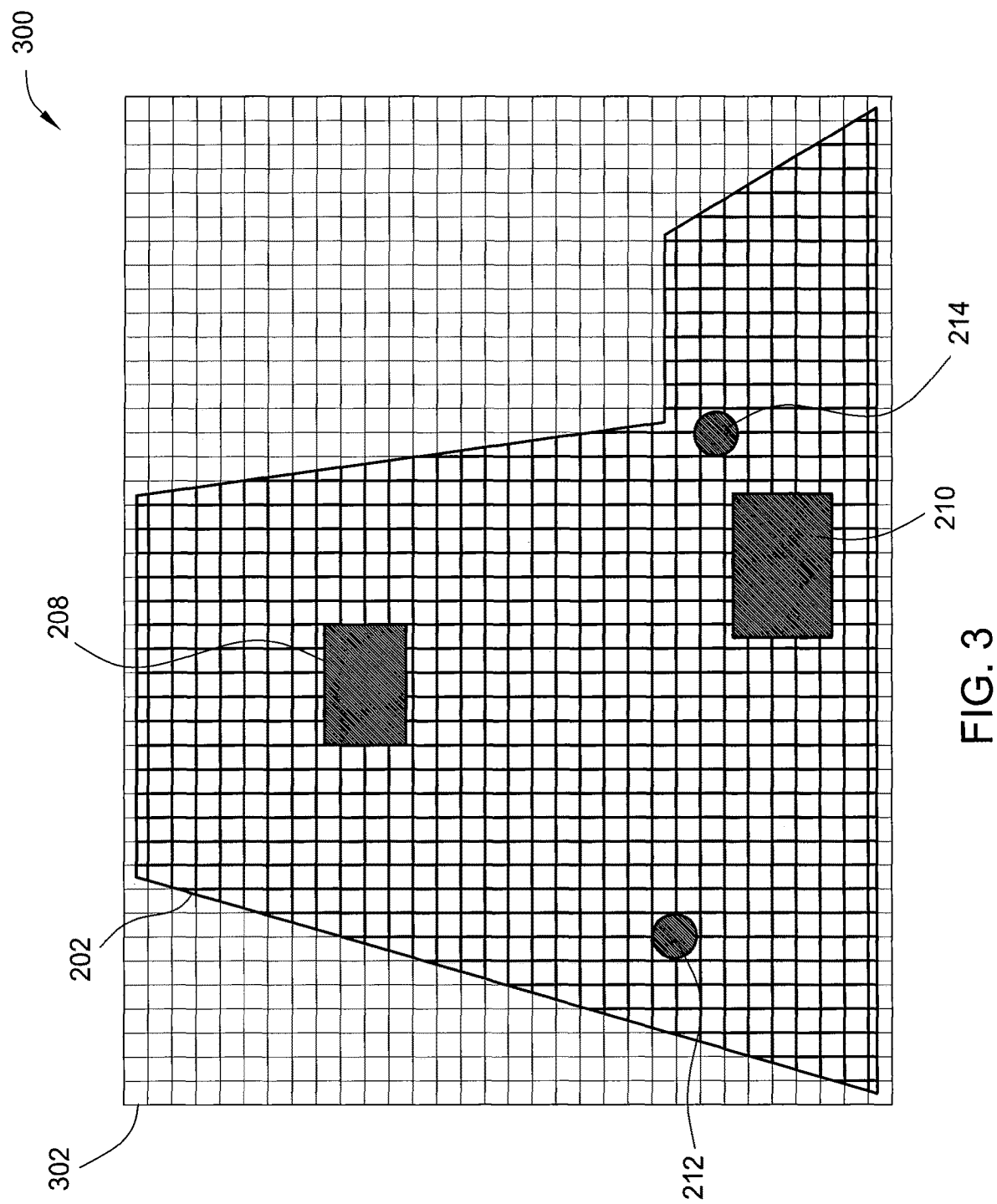

FIG. 3 is a conceptual diagram 300 that illustrates target surface 202 along with obstructions 208, 210, 212, and 214. Conceptual diagram 300 also illustrates a tile grid 302 that is projected by optimization engine 100 onto target surface 202 and includes a set of rectangular tiles. In one embodiment, optimization engine 100 projects tile grid onto target surface 202 so that the lower-left hand corner of target surface 202 resides substantially near the center of the lower-left hand tile. In other embodiments, optimization engine 100 may project tile grid 302 onto target surface 202 at various other locations and with various different sizes and orientations of tiles. Optimization engine 100 is configured to cull tiles that do not sufficiently overlap target surface 202, as described below in conjunction with FIG. 4.

Figure 4:
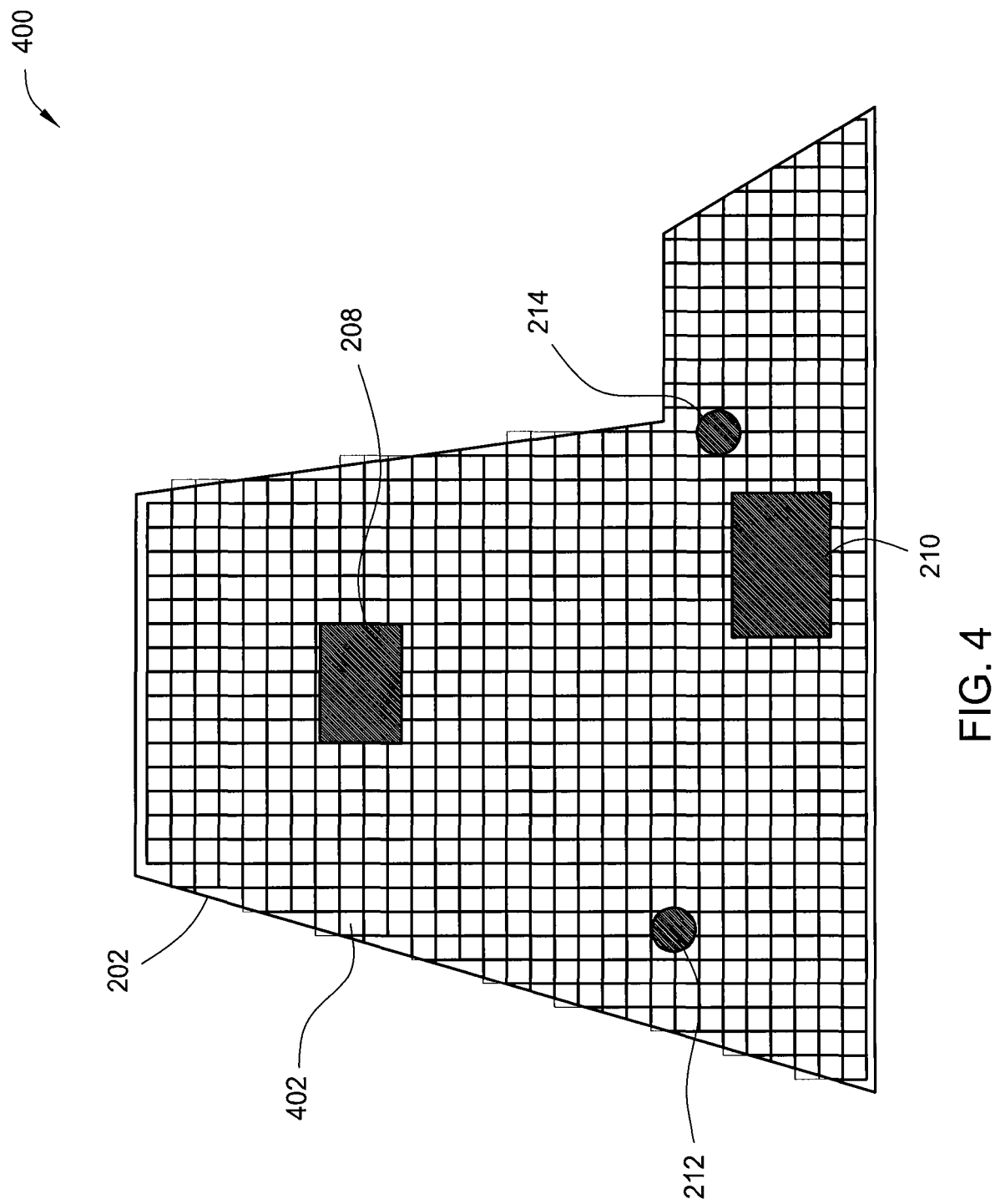

FIG. 4 is a conceptual diagram 400 that illustrates target surface 202 along with obstructions 208, 210, 212, and 214. Conceptual diagram 400 also illustrates tiles 402 that are projected by optimization engine 100 onto target surface 202 using tile grid 302 described previously in conjunction with FIG. 3. Optimization engine 100 identifies tiles within tile grid 302 that overlap target surface 202, removes all other tiles, and retains tiles 402, as shown in FIG. 4. In one embodiment, optimization engine 100 determines that a given tile overlaps target surface 202 when the center of that tile resides within the boundary of target surface 202. In another embodiment, optimization engine 100 may determine that a given tile overlaps target surface 202 when the entire tile resides within the boundary of target surface 202. Optimization engine 100 may then cull any of tiles 402 that fail to meet various requirements, as described below in conjunction with FIG. 5.

Figure 5:
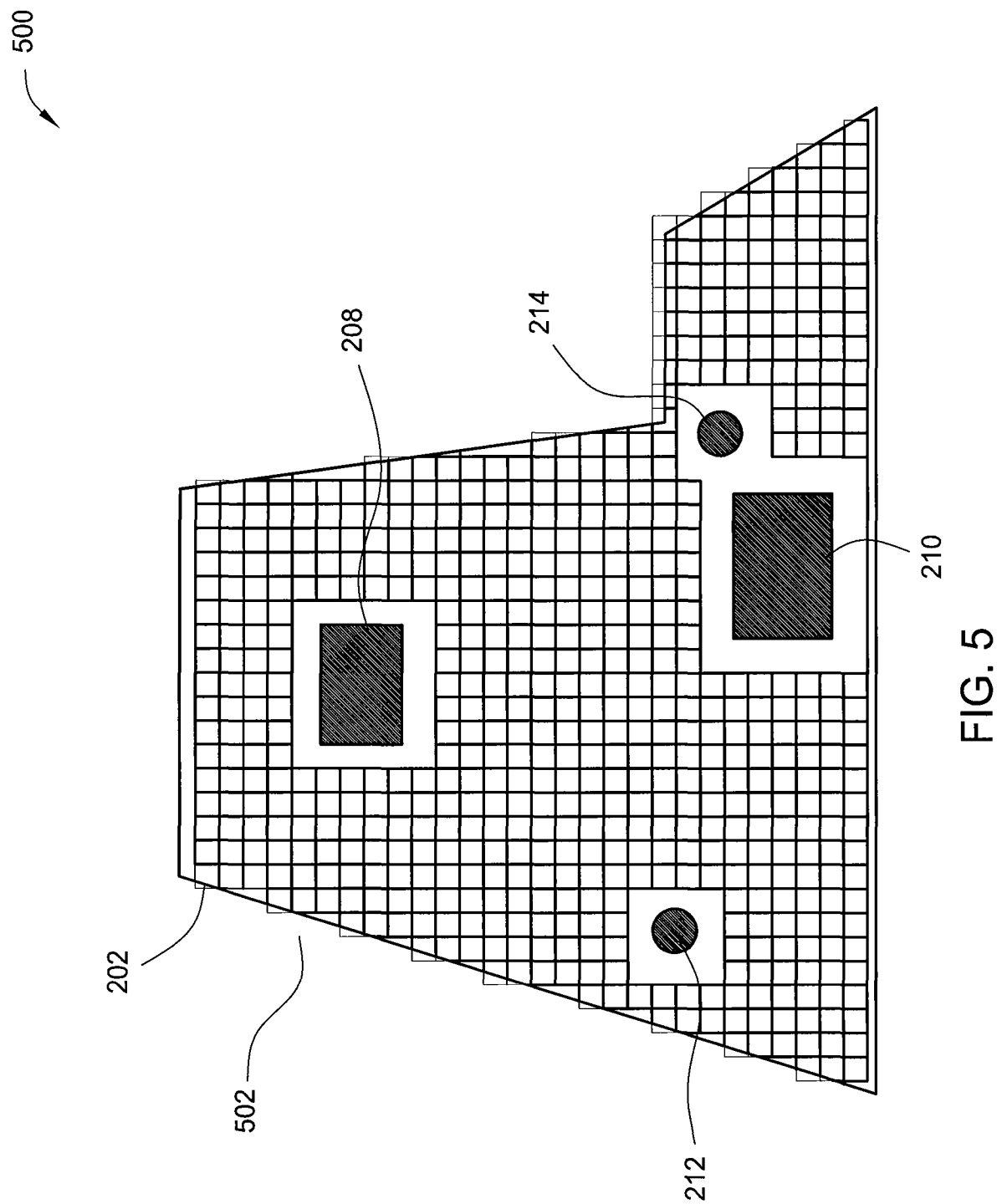

FIG. 5 is a conceptual diagram 500 that illustrates target surface 202 along with obstructions 208, 210, 212, and 214 and tiles 502. Tiles 502 represent a subset of tiles 402 described above. Optimization engine 100 removes tiles from tiles 402 that reside within a threshold distance from obstructions 208, 210, 212, and 214 in order to generate tiles 502. As shown, tiles 502 do not include any tiles residing along a border of obstructions 208, 210, 212, and 214. The remaining tiles 502 represent specific regions where a solar power module may be irradiated with sunlight. In practice, each of tiles 502 may have an area that is less than the area of a solar module, although persons skilled in the art will recognize that tiles 500 having a wide variety of different areas relative to the areas of different solar modules are also possible. As described below in conjunction with FIG. 6, optimization engine 100 generates a performance estimate for each one of tiles 502. The performance estimate for a given tile could indicate, for example, the estimated gross annual revenue associated with the tile location.

Figure 6:
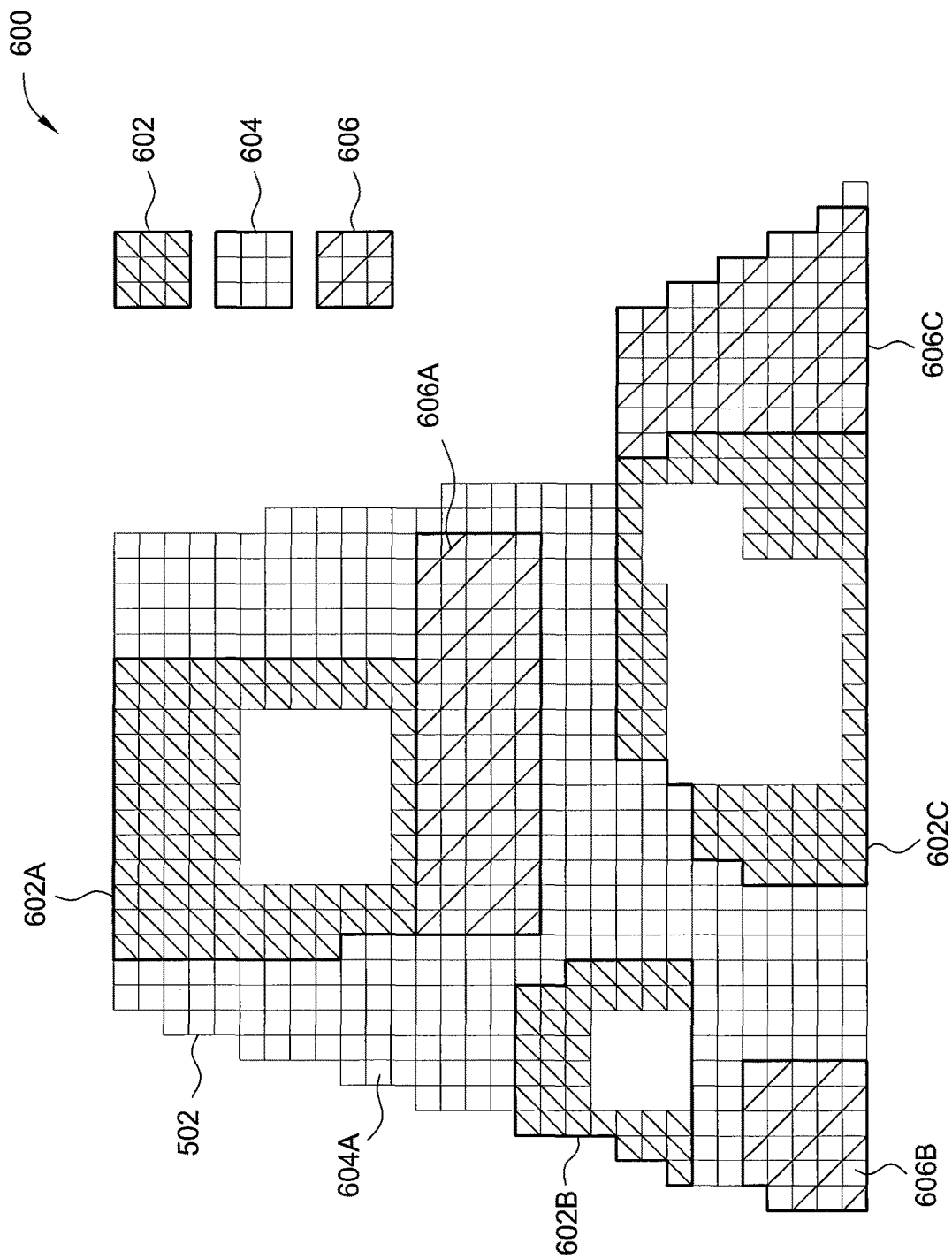

FIG. 6 is a conceptual diagram 600 that illustrates tiles 502. For the sake of clarity, target surface 202 and obstructions 208, 210, 212, and 214 have been omitted from FIG. 6. As shown, tiles 502 have been separated into various areas 602, 604, and 606. The different areas represent different performance estimates generated by optimization engine 100. For example, tiles 502 within areas 602A, 602B, and 602C may have substantially similar performance estimates to one another. Likewise, tiles 502 within area 604A may have substantially similar performance estimates to one another and tiles 502 within areas 606A, 606B, and 606C may have substantially similar performance estimates to one another.

Persons skilled in the art will recognize that areas 602, 604, and 606 are presented merely to illustrate the different performance estimates that may be generated by optimization engine 100 for each of the different tiles 502. In practice, optimization engine 100 generates a different performance estimate for each different tile 502. Optimization engine 100 may generate the performance estimate using a wide variety of techniques, algorithms, formulae, etc. In one embodiment, optimization engine 100 generates the performance estimate for a given tile based on one or more of (i) the location, tilt, and/or orientation of the tile, (ii) a temperature estimate for the tile, (iii) a utility rate corresponding to the location of target surface 202, and (iv) an estimated amount of irradiance, net of shadows, associated with the tile. In another embodiment, optimization engine 100 generates the performance estimate based on the simulated performance of a variety of different solar module types that may be used. Once optimization engine 100 generates the performance estimate for each one of tiles 502, optimization engine 100 culls tiles that fail to meet performance requirements and/or fail to meet construction requirements, as described in greater detail below in conjunction with FIG. 7.

Figure 7:
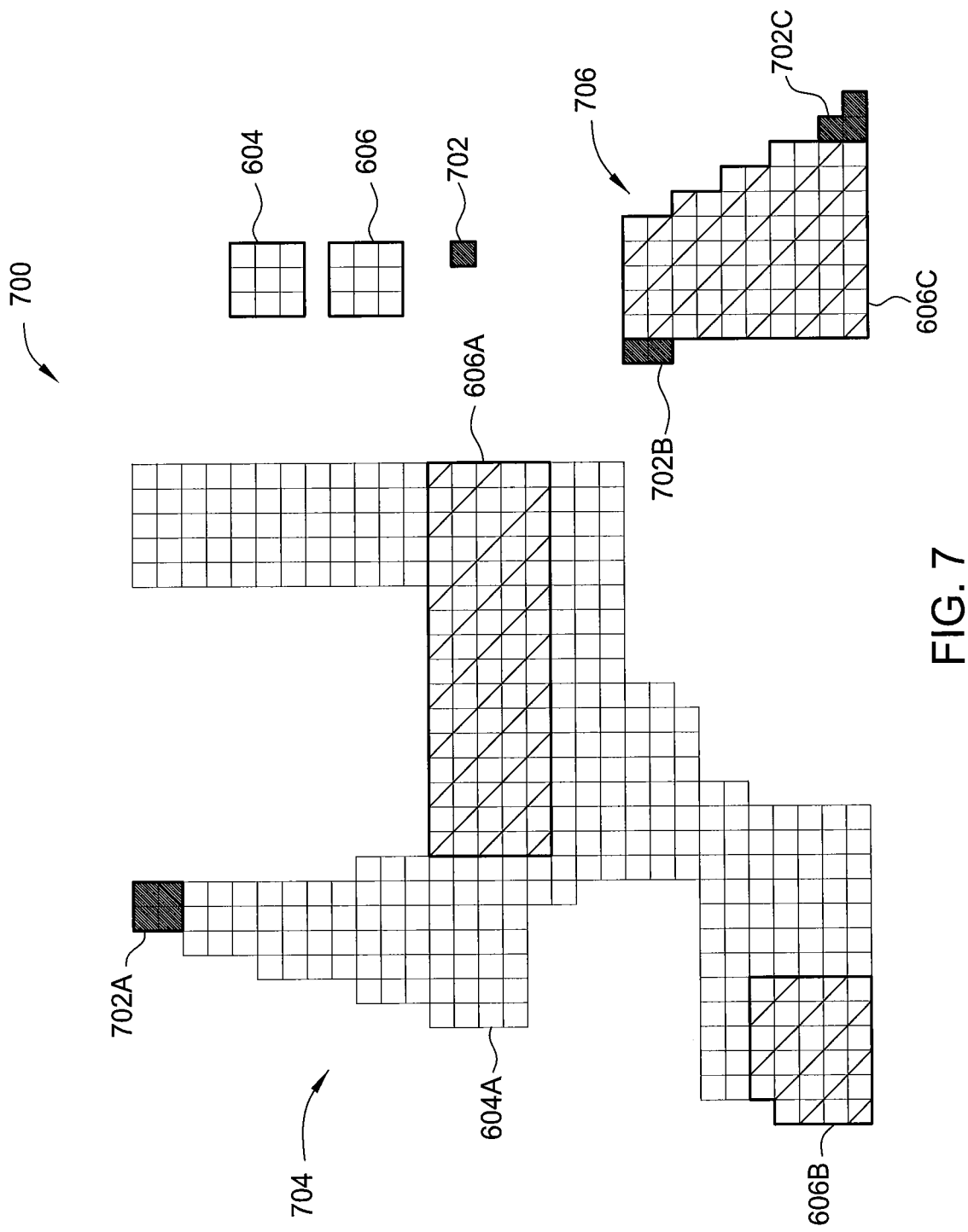

FIG. 7 is a conceptual diagram 700 that illustrates tile regions 704 and 706 that each represents a contiguous set of tiles 502 shown in FIG. 5. Optimization engine 100 generates tile regions 704 and 706 by culling tiles 502 that fail to meet specific performance requirements. More specifically, optimization engine 100 culls tiles 502 that have a performance estimate falling below a threshold value. For example, if the performance estimate for a given tile represents an estimated gross annual revenue generated by the location corresponding to that tile, and the estimated gross annual revenue fell below a "break-even" point, then optimization engine 100 would cull that tile.

As shown, optimization engine 100 has culled all tiles falling within area 602 shown in FIG. 5. As a result, tiles 502 have been fragmented into two separately contiguous tile regions 704 and 706. Optimization engine 100 may also cull additional tiles that fail to meet construction requirements for solar module installation. For example, if the length or width of a given solar module type exceeds the linear distance across two contiguous tiles, then optimization engine 100 may cull any collection of tiles having two or less contiguous tiles in a given direction. In conceptual diagram 700, tiles 702 fail to meet construction requirements. Specifically, tiles 702A include two or less contiguous tiles in both a horizontal and vertical direction. Likewise, tiles 702B include two or less contiguous tiles in a vertical direction, and tiles 702C include two or less contiguous tiles in either a vertical or a horizontal direction.

Persons skilled in the art will understand that the number of contiguous tiles required in a given direction may vary across embodiments, and that optimization engine 100 has been described as requiring more than two contiguous tiles in a given direction purely for exemplary purposes. Upon culling tiles 502 that fail to meet performance and/or construction requirements, optimization engine 100 projects a module grid onto each of tile regions 704 and 706, as described below in conjunction with FIG. 8.

Figure 8:
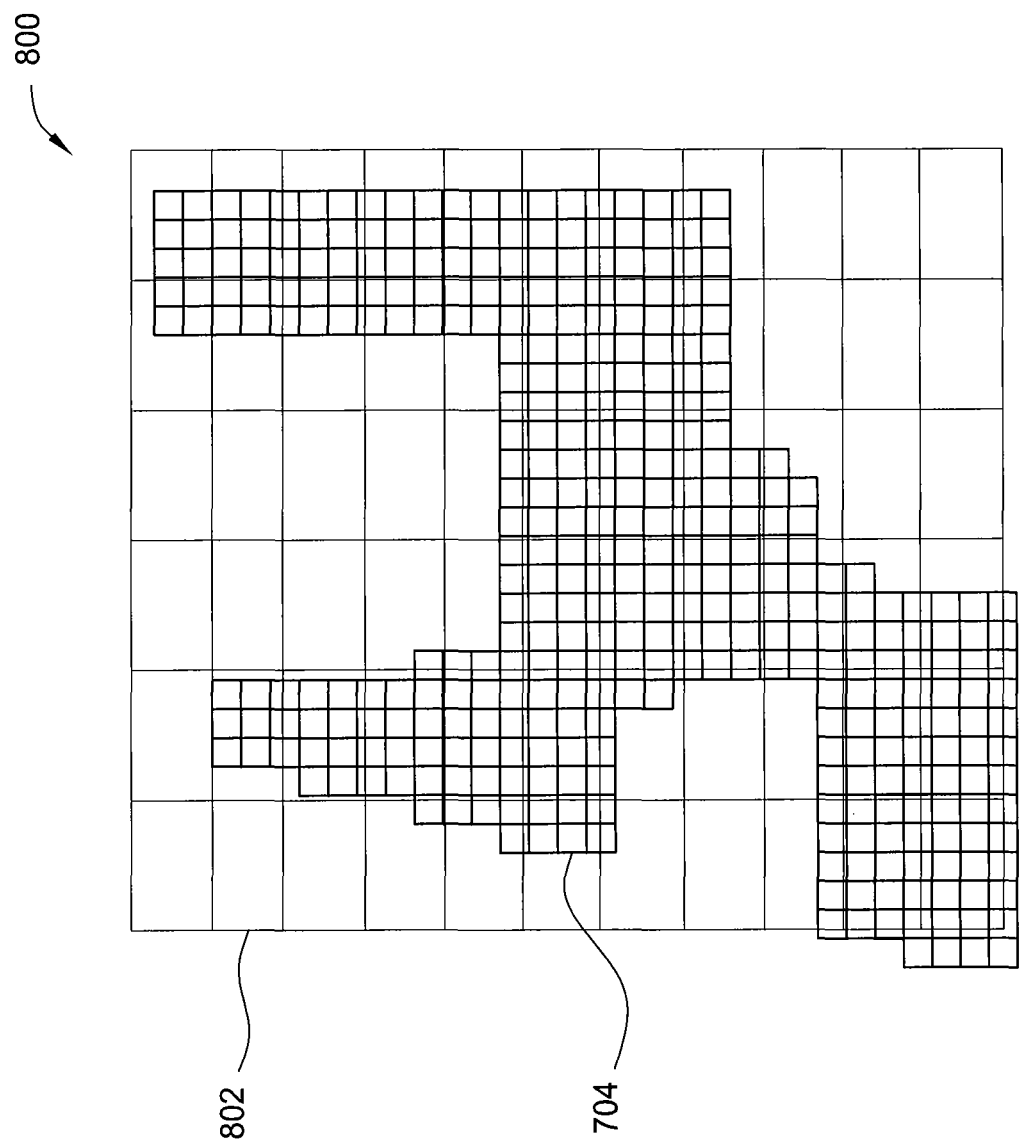

FIG. 8 is a conceptual diagram that illustrates a module grid 802 projected onto tile region 704. As mentioned above, optimization engine 100 also projects a module grid onto tile region 706 (not shown here). However, for the sake of simplicity, the techniques performed by optimization engine 100 using module grids will be described solely in regards to module grid 802 projected onto tile region 704. However, persons skilled in the art will recognize that the techniques described herein are equally applicable to projecting module grids onto any tile region, including tile region 706.

Module grid 802 represents a planar area tiled with solar modules. The module grid 802 may include the inter-module separation required by good installation practice, and, in further embodiments, includes modules of different dimensions, ordinations and origins. In the exemplary embodiment shown, each solar module in module grid 802 is oriented such that the horizontal dimension exceeds the vertical dimension. In other words, each solar module is disposed with a "landscape" orientation. In other embodiments, each solar module is disposed with a "portrait" orientation, where the vertical dimension exceeds the horizontal dimension. Optimization engine 100 is configured to cull solar modules that fail to meet construction requirements, as described in greater detail below in conjunction with FIG. 9.

Figure 9:
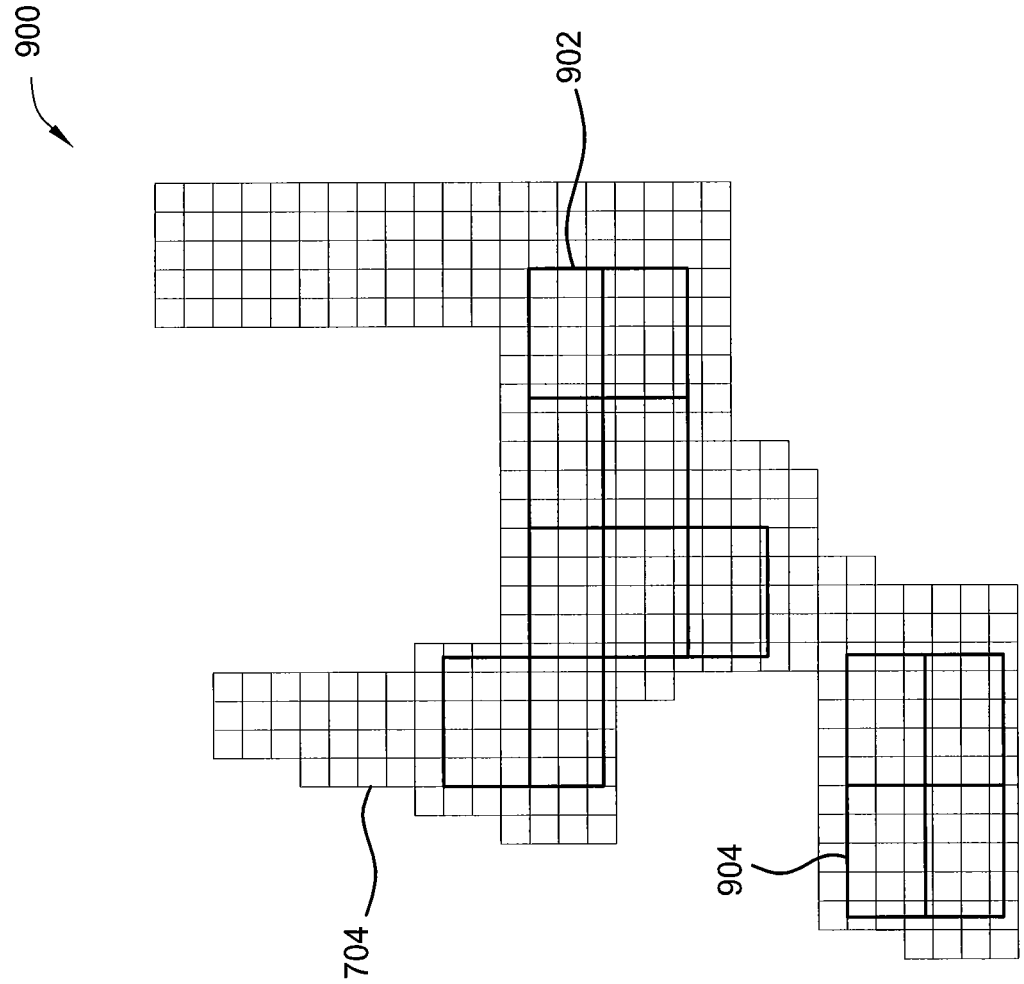

FIG. 9 is a conceptual diagram that illustrates tile region 704 as well as solar module arrays 902 and 904. Optimization engine 100 generates solar module arrays 902 and 904 by culling solar modules from module grid 802 shown in FIG. 8. Optimization engine 100 culls solar modules that fail to reside entirely on tile region 704. Such solar modules may not be able to be effectively installed on target surface 202. Optimization engine 100 may then generate a performance estimate for each solar module within solar module arrays 902 and 904.

Optimization engine 100 may generate the performance estimate using a wide variety of techniques and may measure performance using a wide variety of performance metrics. As mentioned above in conjunction with FIG. 1, the performance metric could be, e.g., LCOE or estimated gross annual revenue, among others. In one embodiment, optimization engine 100 implements Sandia National Laboratories' PV Performance Model and estimates the performance of each solar module based on one or more of (i) the location and/or orientation of target surface 202, (ii) the solar module type associated with module grid 802, (iii) a utility rate corresponding to the location of target surface 202, (iv) an amount of irradiance net of shading associated with each solar module, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6 or 7 Parameter models can be used in place of the Sandia National Laboratories' PV Performance Model.

Optimization engine 100 determines the performance estimate for each of solar module arrays 902 and 904 based on the performance estimates for each of the solar modules included in those solar module arrays. Optimization engine 100 then identifies the solar module array with an optimal performance estimate. In the exemplary embodiment described herein, solar module array 902 is determined to have the optimal performance estimate.

In practice, optimization engine 100 may repeat the steps of projecting the module grid onto tile region 704, culling certain solar modules, generating a performance estimate for each remaining solar module, and determining a performance estimate for each solar module array, for various different module grid types and projection locations. In doing so, optimization engine 100 may generate a collection of possible solar module arrays each having a different overall performance estimate. Optimization engine 100 may then identify the solar module array having the optimal performance estimate from the collection of solar module arrays. In the exemplary embodiment described herein, solar module array 902 represents the solar module array having an optimal performance estimate. Once solar module array 902 has been identified, optimization engine 100 excludes the complete and fractional tiles associated with solar module array 902 from further processing, and then culls from tile region 704 any tiles that fail to meet construction requirements, as described in greater detail below in FIG. 10.

Figure 10:
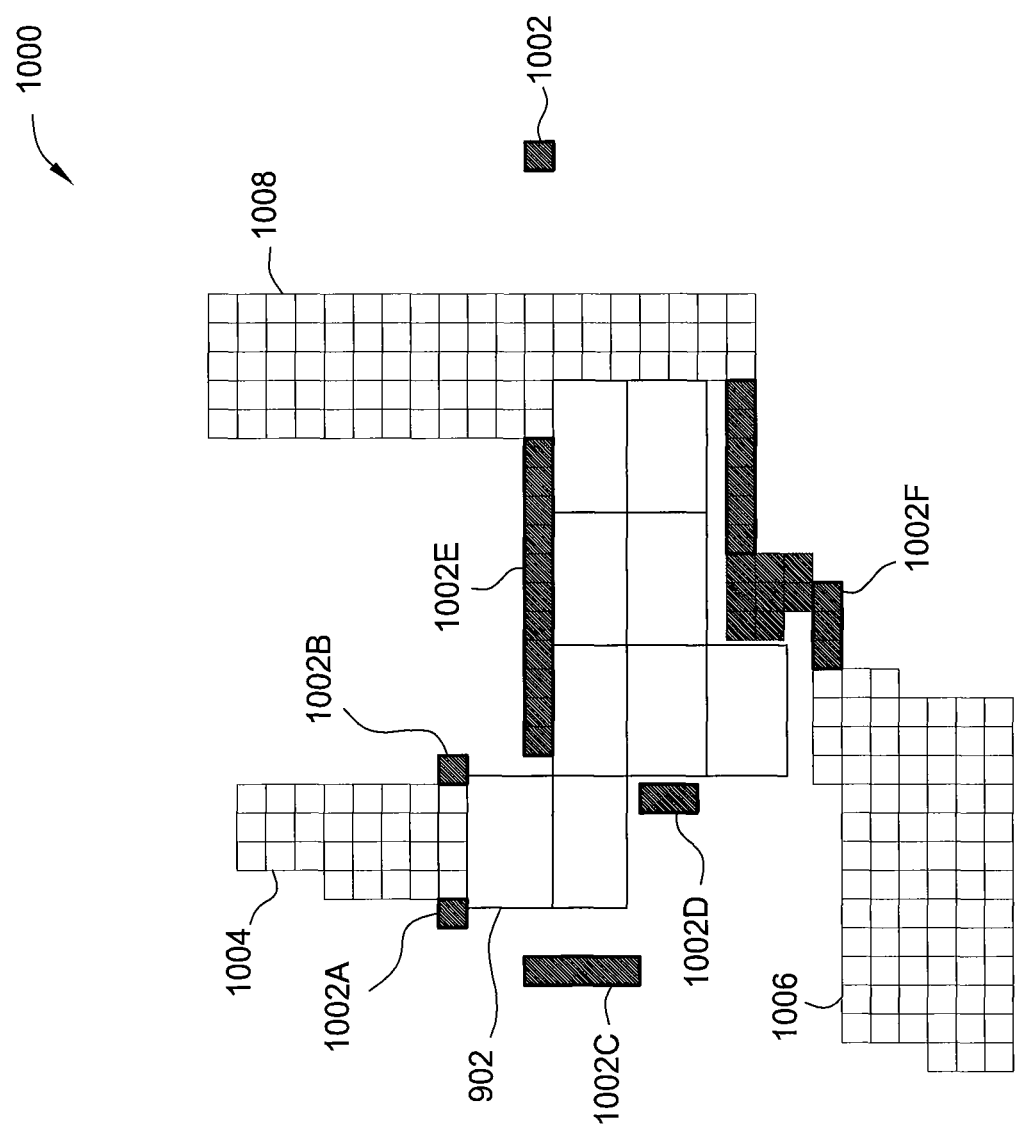

FIG. 10 is a conceptual diagram 1000 that illustrates solar module array 902 as well as tile subregions 1004, 1006, and 1008. As mentioned above in conjunction with FIG. 9, optimization engine 100 is configured to cull tiles that fail to meet construction requirements. In conceptual diagram 1000, tiles 1002 fail to meet construction requirements. Specifically, tiles 1002A include two or less contiguous tiles in either a horizontal or vertical direction. Likewise, tiles 1002B, 1002C, 1002D, 1002E, and 1002F include two or less tiles in either a horizontal or vertical direction. As previously mentioned, persons skilled in the art will understand that the number of contiguous tiles required in a given direction may vary across embodiments, and that optimization engine 100 has been described as requiring more than two contiguous tiles in a given direction purely for exemplary purposes.

Once tiles 1002 have been culled, optimization engine 100 analyzes the size of each tile subregion 1004, 1006, and 1008 to determine whether those tile subregions include a threshold number of tiles. If a given tile subregion includes fewer than the threshold number of tiles, then optimization engine 100 culls that tile subregion from further processing. In conceptual diagram 1000, tile subregion 1004 includes fewer than the threshold number of tiles, and so optimization engine 100 culls that tile subregion. Optimization engine 100 then projects module arrays onto the remaining tile subregions, as described in greater detail below in conjunction with FIG. 11.

Figure 11:
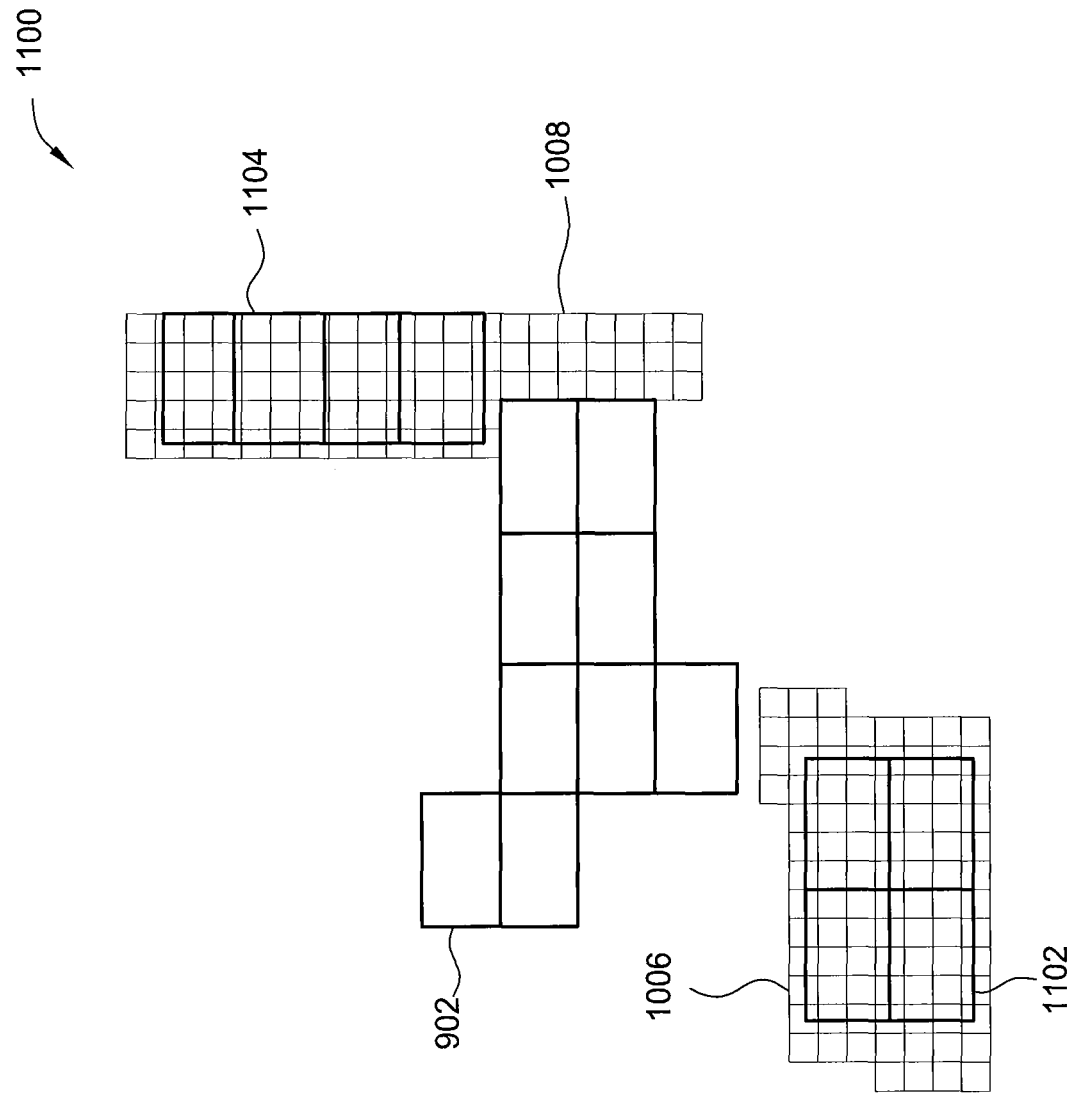

FIG. 11 is a conceptual diagram 1100 that illustrates solar module array 902 and tile subregions 1006 and 1008. Conceptual diagram 1100 also illustrates solar module subarray 1102 projected onto tile subregion 1006 and solar module subarray 1104 projected onto tile subregion 1008. Optimization engine 100 may project solar module arrays 1006 and 1008 using a variety of techniques, including, e.g., the "module grid" approach described above in conjunction with FIG. 8. In doing so, optimization engine 100 may project a different "module subgrid" onto each tile subregion. Optimization engine 100 is configured to project arrays of solar modules of any type and/or orientation onto tile subregions 1006 and 1008. Optimization engine 100 is also configured to generate a performance estimate for solar module subarrays 1102 and 1104 using the techniques described above in conjunction with FIG. 9.

When generating the performance estimate, optimization engine 100 may repeat the steps of projecting a module subgrid onto each of tile subregions 1106 and 1008, culling certain solar modules, generating a performance estimate for each remaining solar module, and determining a performance estimate for each solar module subarray, for various different module subgrid types and projection locations. Optimization engine 100 may generate a collection of possible solar module subarrays for each tile subregion, each having a different overall performance estimate. For a given tile subregion, optimization engine 100 may then identify the solar module subarray associated with that tile subregion having the optimal performance estimate from the collection of solar module subarrays associated with that tile subregion.

In the exemplary embodiment shown in FIG. 11, optimization engine 100 identifies solar module subarrays 1102 and 1104 as having the optimal performance estimates for tile subregions 1006 and 1008, respectively. Having placed solar modules on all remaining tiles, optimization engine 100 stores the specific placement of solar module array 902 and solar module subarrays 1006 and 1008 in configuration data 112 shown in FIG. 1. Optimization engine 100 also stores in configuration data 112 the specific module types yielding the optimal performance estimate for solar module array 902 and solar module subarrays 1106 and 1008.

By performing the various steps described in conjunction with FIG. 2-11, optimization engine 100 may determine a configuration of solar modules that, when installed as part of a solar power system, optimize a particular performance metric. Those steps are described in greater detail below in conjunction with FIGS. 12-15.

Figure 12:
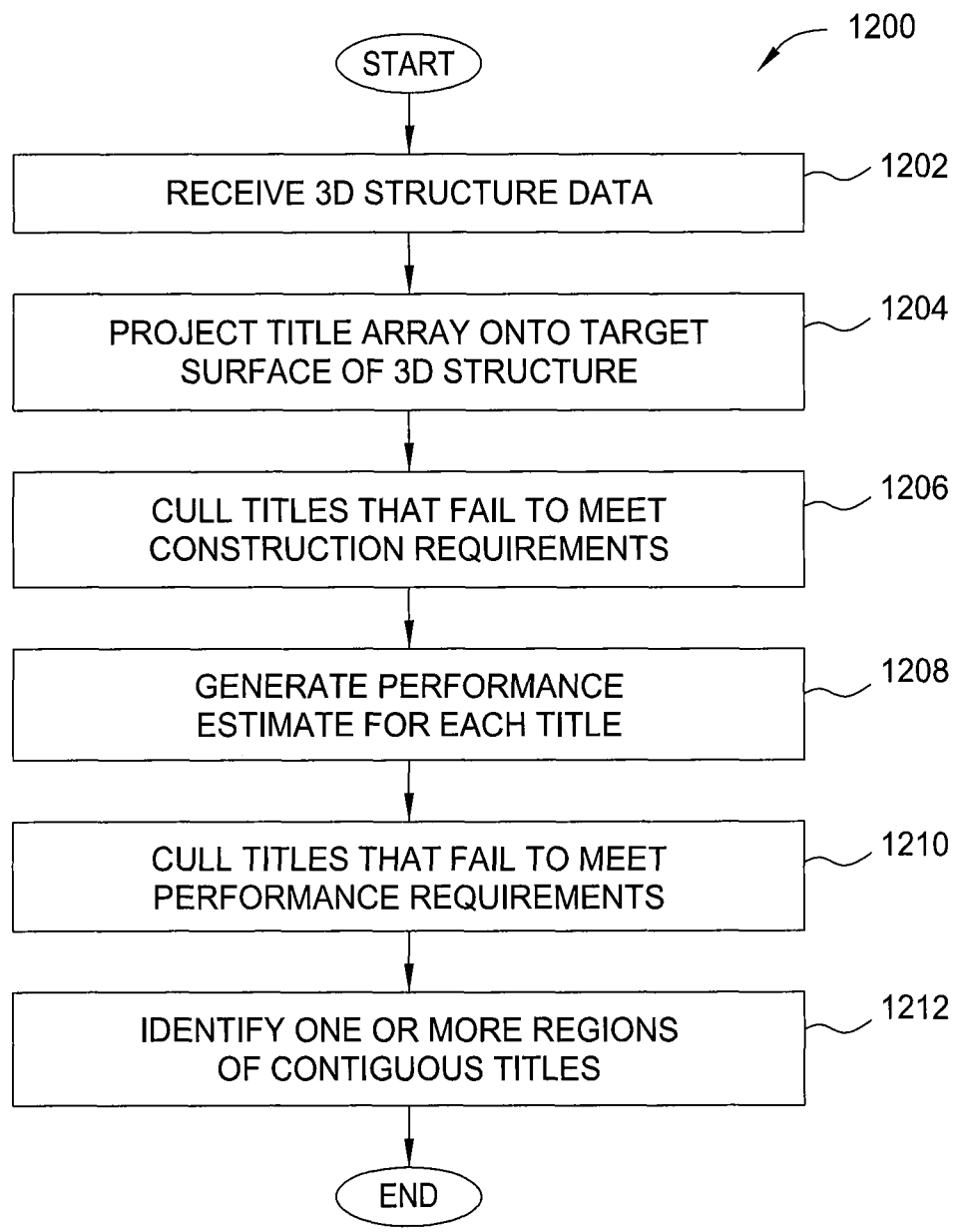
FIG. 12 is a flowchart of method steps for identifying one or more subregions of contiguous tiles projected onto a target surface, according to one embodiment of the present invention.

FIG. 12 is a flowchart of method steps for identifying one or more regions of contiguous tiles projected onto a target surface, according to embodiment of the present invention. Persons skilled in the art will understand that, although the method 1200 is described in conjunction with the system of FIG. 1, any system configured to perform the method steps, in any order, is within the scope of the present invention.

As shown, the method 1200 begins at step 1202, where optimization engine 100 receives data that represents a 3D structure. Optimization engine 100 may extract that data from a geospatial data set residing in database 116 or CAD interface 114. The data representing the 3D structure indicates a target surface, such as, e.g., target surface 202 shown in FIG. 2. The target surface may be suitable for a solar power system installation.

At step 1204, optimization engine 100 projects a tile grid onto the target surface. For example, the tile grid could be tile grid 302 projected onto target surface 202, as shown in FIG. 3. At step 1206, optimization engine 100 culls tiles that fail certain construction requirements. For example, optimization engine 100 may cull tiles that do not overlap the target surface, as shown in FIG. 4. Optimization engine 100 may also cull tiles residing too close to obstructions within the target surface, as shown in FIG. 5.

At step 1208, optimization engine 100 generates a performance estimate for each remaining tile. Optimization engine 100 may generate the performance estimate using a wide variety of techniques, algorithms, formulae, etc. In one embodiment, optimization engine 100 generates the performance estimate for a given tile based on one or more of (i)

the location, tilt, and/or orientation of the tile, (ii) a temperature estimate for the tile, (iii) a utility rate corresponding to the location of the target surface, (iv) an estimated amount of irradiance net of shading associated with the tile, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6 or 7 Parameter models can be used in place of the Sandia National Laboratories' PV Performance Model.

FIG. 6 illustrates one example of a performance estimate generated by optimization engine 100.

At step 1210, optimization engine 100 culls tiles that fail to meet performance requirements. For example, optimization engine 100 could cull any tiles having an estimated gross annual revenue that falls below a certain threshold. Optimization engine 100 may then cull additional tiles that fail to meet construction requirements for a given type of solar module. For example, if the length or width of a given solar module type exceeds the linear distance across two contiguous tiles, then optimization engine 100 may cull any collection of tiles having two or less contiguous tiles in a given direction. In performing step 1210 of the method 1200, optimization engine 100 may generate one or more regions of contiguous tiles. At step 1212, optimization engine 100 identifies the one or more regions of contiguous tiles, such as, e.g., tile region 704 shown in FIG. 7.

The method 1200 represents one technique for identifying one or more regions of contiguous tiles. Persons skilled in the art will recognize that other techniques may also be possible for identifying a region of contiguous tiles. As described below in conjunction with FIG. 13, optimization engine 100 may be configured to perform additional processing operations on regions of contiguous tiles.

Figure 13:
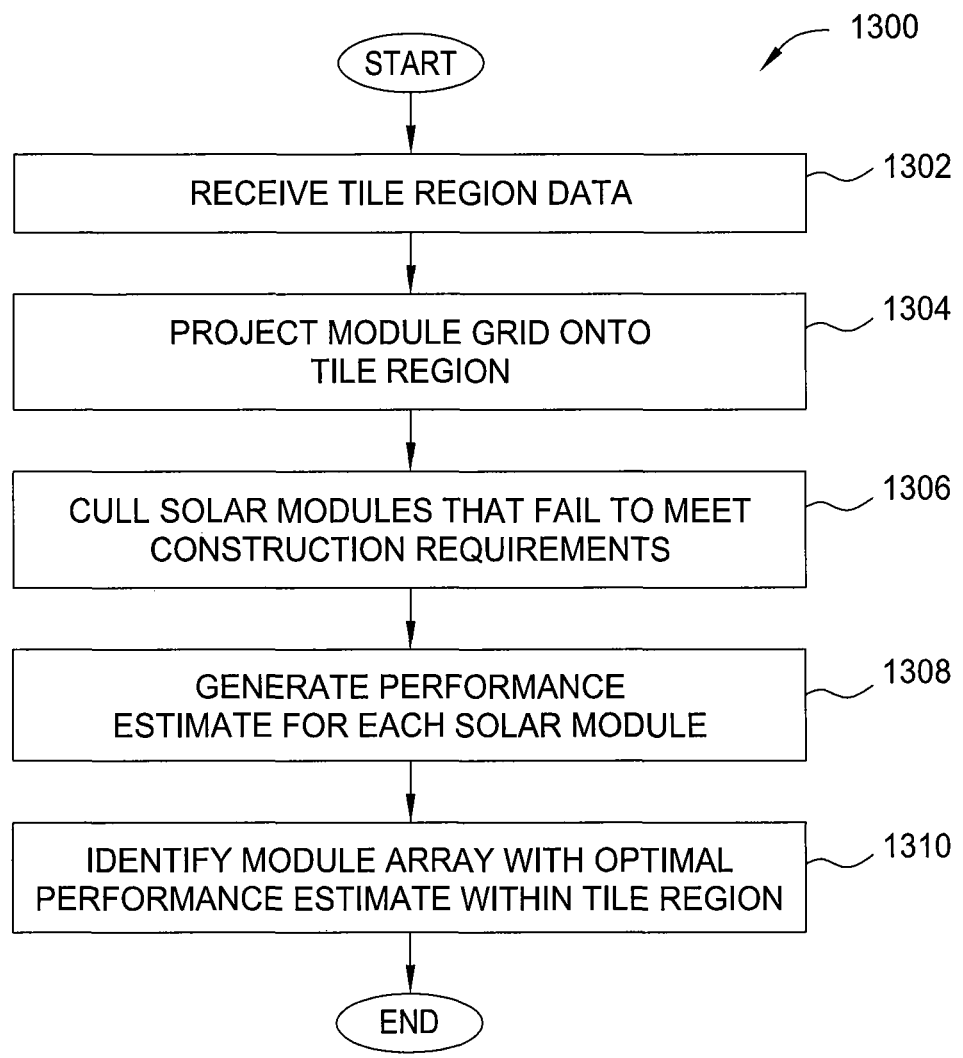
FIG. 13 is a flowchart of method steps for indentifying an array of contiguous solar modules having an optimal performance estimate within a region of contiguous tiles.

FIG. 13 is a flowchart of method steps for indentifying an array of contiguous solar modules having an optimal performance estimate within a region of contiguous tiles. Persons skilled in the art will understand that, although the method 1300 is described in conjunction with the system of FIG. 1, any system configured to perform the method steps, in any order, is within the scope of the present invention.

As shown, the method 1300 begins at step 1302, where optimization engine 100 receives data that describes a region of contiguous tiles, i.e. a "tile region." In one embodiment, optimization engine 100 implements the method 1200 to identify the tile region, which could be, for example, tile region 704 shown in FIG. 7. At step 1304, optimization engine 100 projects a module grid onto the tile region. The module grid represents a planar area tiled with solar modules such as, for example, module grid 802 shown in FIG. 8.

At step 1306, optimization engine 100 culls solar modules from the module grid that fail to meet construction requirements. For example, optimization engine 100 may cull solar modules that do not reside entirely on the tile region because those solar modules may not be effectively installed on the target surface. At step 1308, optimization engine 100 generates a performance estimate for each remaining solar module. Optimization engine 100 may also generate performance estimates for contiguous arrays of solar modules, such as solar module arrays 902 and 904 shown in FIG. 9.

At step 1310, optimization engine 100 identifies the solar module array with an optimal performance estimate. The performance estimate could be based on computing a performance metric such as LCOE or estimated gross annual revenue for the solar module array. In one embodiment, optimization engine 100 implements Sandia National Laboratories' PV Performance Model and estimates the performance of each solar module array based on one or more of (i) the location and/or orientation of the target surface, (ii) the solar module type within the solar module array, (iii) a utility rate corresponding to the location of the target surface, (iv) an amount of irradiance net of shading associated with each solar module within the solar module array, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6 or 7 Parameter models can be used in place of the Sandia National Laboratories' PV Performance Model.

Optimization engine 100 may repeat steps 1302, 1304, 1306, and 1308 for various different module grid types, orientations and projection locations. In doing so, optimization engine 100 may generate a collection of possible solar module arrays for each tile region, where each solar module array has a different overall performance estimate. For each tile region, optimization engine 100 may then identify the solar module array associated with that tile region having the optimal performance estimate from the collection of solar module arrays.

By performing the method 1300, optimization engine 100 identifies an array of contiguous solar modules that, as a whole, has an optimal performance estimate compared to other possible arrays of solar modules. Optimization engine 100 may then identify tile subregions within the target surface where additional solar modules may be placed, as described in greater detail below in conjunction with FIG. 14.

Figure 14:
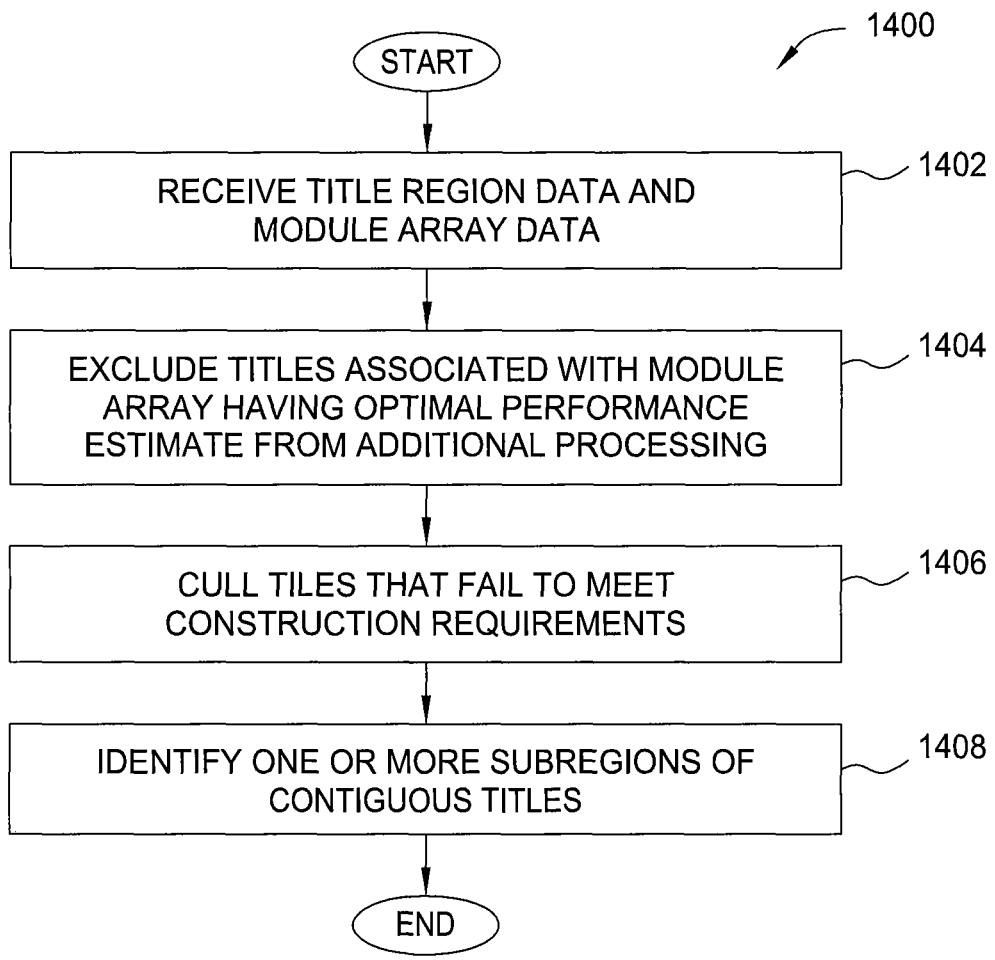
FIG. 14 is a flowchart of method steps for identifying one or more subregions of contiguous tiles projected onto a target surface, according to one embodiment of the present invention.

FIG. 14 is a flowchart of method steps for identifying one or more subregions of contiguous tiles projected onto a target surface, according to one embodiment of the present invention. Persons skilled in the art will understand that, although the method 1400 is described in conjunction with the system of FIG. 1, any system configured to perform the method steps, in any order, is within the scope of the present invention.

As shown, the method 1400 begins at step 1402, where optimization engine 100 receives tile region data and solar module array data. The tile region could be, e.g. tile region 704 shown in FIG. 7, and the solar module array could be, e.g., solar module array 902 shown in FIG. 9. Optimization engine 100 may identify the tile region and solar module array by implementing the methods 1200 and 1300 described above in conjunction with FIGS. 12 and 13, respectively. At step 1404, optimization engine 100 excludes tiles associated with the solar module array having the optimal performance estimate from additional processing.

At step 1406, optimization engine culls tiles that fail to meet construction requirements for a given type of solar module. For example, if the length or width of a given solar module type exceeds the linear distance across two contiguous tiles, then optimization engine 100 may cull any collection of tiles having two or less contiguous tiles in a given direction. Optimization engine 100 also culls tiles that belong to a set of contiguous tiles having less than a threshold number of tiles. Those regions may have insufficient area on which to place a solar module. Optimization engine 100 may cull different tiles based on different types of solar module and, in practice, may perform step 1406 for all possible solar module types.

At step 1408, optimization engine 100 identifies one or more subregions of contiguous tiles, i.e. "tile subregions." For example, optimization engine 100 could identify tile subregions 1006 and 1008 shown in FIG. 10. As described in greater detail below in conjunction with FIG. 15, optimization engine 100 may then place additional solar modules on the identified tile subregions.

Figure 15:
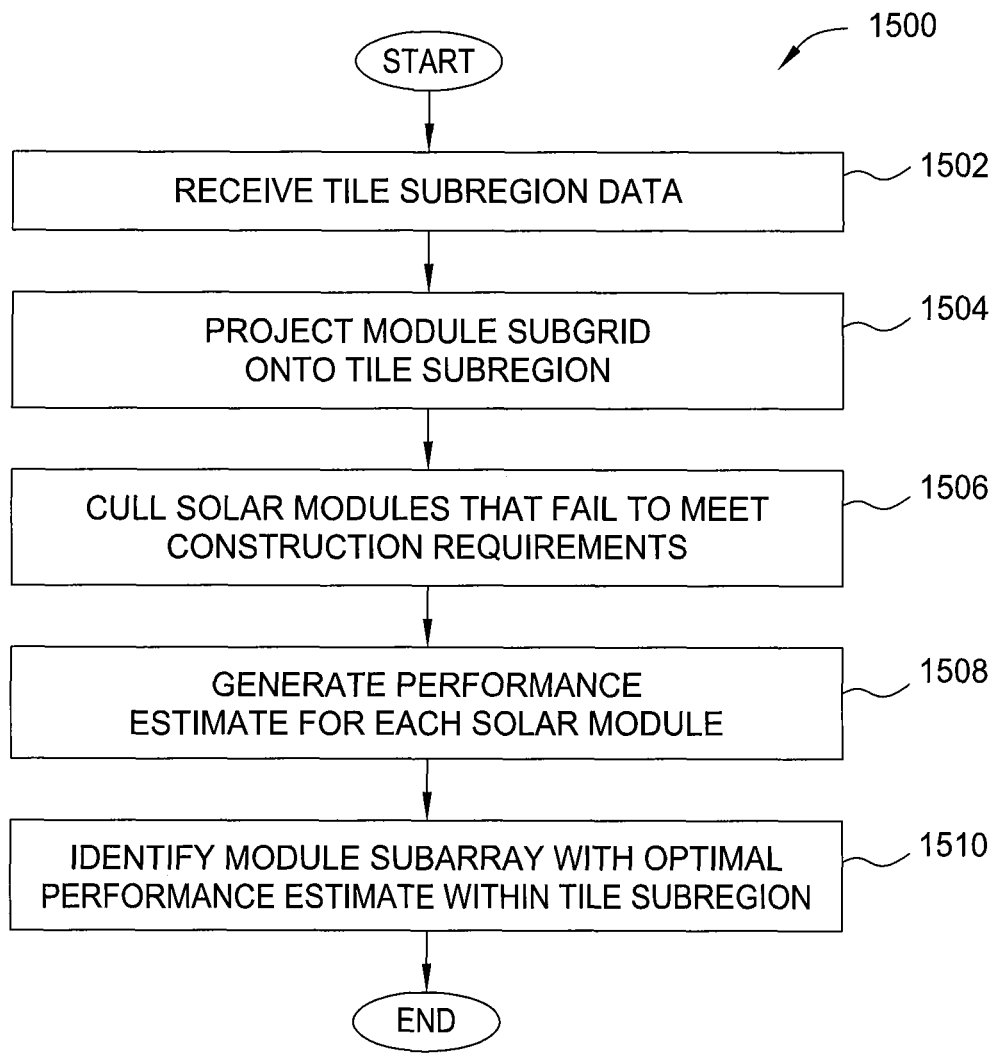
FIG. 15 is a flowchart of method steps for identifying a subarray of contiguous solar modules having an optimal performance estimate within a subregion of contiguous tiles, according to one embodiment of the present invention.

FIG. 15 is a flowchart of method steps for identifying a subarray of contiguous solar modules having an optimal performance estimate within a tile subregion. Persons skilled in the art will understand that, although the method 1500 is described in conjunction with the system of FIG. 1, any system configured to perform the method steps, in any order, is within the scope of the present invention.

As shown, the method 1500 begins at step 1502, where optimization engine 100 receives data that describes a tile subregion. In one embodiment, optimization engine 100 implements the method 1400 to identify the tile subregion. The tile subregion could be, for example, tile subregion 1006 or 1008 shown in FIG. 10. At step 1504, optimization engine 100 projects a module subgrid onto the tile subregion. The module subgrid represents a planar area tiled with solar modules.

At step 1506, optimization engine 100 culls solar modules from the module subgrid that fail to meet construction requirements. For example, optimization engine 100 may cull solar modules that do not reside entirely on the tile subregion because those solar modules may not be effectively installed on the target surface. At step 1508, optimization engine 100 generates a performance estimate for each remaining solar module. Optimization engine 100 may also generate performance estimates for contiguous subarrays of solar modules, such as solar module subarrays 1102 and 1104 shown in FIG. 9.

At step 1510, optimization engine 100 identifies the solar module subarray with an optimal performance estimate for each tile subregion. The performance estimate could be based on computing a performance metric such as LCOE or estimated gross annual revenue for the solar module array. In one embodiment, optimization engine 100 implements Sandia National Laboratories' PV Performance Model and estimates the performance of each solar module array based on one or more of (i) the location and/or orientation of the target surface, (ii) the solar module type within the solar module array, (iii) a utility rate corresponding to the location of the target surface, (iv) an amount of irradiance, net of shading, associated with each solar module within the solar module array, (v) long-term average or typical weather data as well as measured weather data of arbitrary duration and frequency as well as (vi) power flow simulators that account for module electrical wiring and topology. In other embodiments, National Renewable Energy Lab's PVWatts or the University of Wisconsin 5, 6 or 7 Parameter models can be used in place of the Sandia National Laboratories' PV Performance Model.

Optimization engine 100 may repeat steps 1502, 1504, 1506, and 1508 for various different module subgrid types, orientation and projection locations. In doing so, optimization engine 100 may generate a collection of possible solar module subarrays for each tile subregion, each having a different overall performance estimate. For each tile subregion, optimization engine 100 may then identify the solar module array associated with that tile subregion that has the optimal performance estimate relative to the collection of solar module arrays associated with that tile subregion.

By performing the method 1500, optimization engine 100 identifies a solar module array for a given tile subregion that has an optimal performance estimate compared to other possible solar module arrays. Persons having ordinary skill the art will recognize that the method 1500 for identifying the solar module array with the optimal performance estimate within a tile subregion is substantially similar to the method 1300 for identifying the solar module array with the optimal performance estimate within a tile region. In practice, optimization engine 100 may implement either the method 1300 or the method 1500 with any collection of tiles, including a tile region, a tile subregion, a tile sub-subregion, and so forth, in order to identify a solar module array, solar module subarray, solar module sub-subarray, and so forth, with the optimal performance estimate. In one embodiment, optimization engine 100 implements the method 1300 or 1500 recursively with progressively smaller collections of tiles.

Additionally, optimization engine 100 may implement the methods 1200, 1300, 1400, and 1500 repeatedly using various different parameters, such as tile size, tile grid projection location, tile construction requirements, tile performance requirements, solar module type and/or orientation, module grid projection point, solar module construction requirements, or solar module performance requirements. Optimization engine 100 is configured to repeat the methods described above in order to identify the optimized configuration of solar modules to be used in a solar power system installation.

Referring again to FIG. 1, client-side optimization engine 110 and cloud-based optimization engine 130, both residing within optimization engine 100, are configured to implement the methods 1200, 1300, 1400 and 1500 in conjunction with one another. For example, client-side optimization engine 110 may cause cloud-based optimization engine 130 to perform the methods described herein using cloud-based computing resources included within computing device 122. In general, any combination of computing devices configured to perform the aforementioned methods falls within the scope of the present invention including a non-distributed version (desktop application).

In sum, an optimization engine is configured to generate an optimized configuration of solar modules to be used in a solar power system. The optimization engine receives data that describes a target surface and projects a set of tiles onto that surface. The optimization engine then generates a performance estimate for each of those tiles and eliminates tiles that fail to meet construction requirements and/or performance requirements. The optimization engine then projects an array of solar modules onto the tiles and generates a performance estimate for that solar module array. By generating performance estimates for a variety of different possible solar module arrays, the optimization engine identifies the optimally-performing solar module array.

The optimization engine then excludes the tiles associated with the optimally-performing solar module array from additional processing and projects one or more subarrays of solar modules onto the remaining tiles. As with the original set of tiles, the optimization engine then generates a performance estimate for the one or more solar module subarrays. By generating performance estimates for a variety of different possible solar module subarrays, the optimization engine identifies one or more optimally-performing solar module subarrays. The optimization engine may perform the techniques described herein repeatedly until no additional solar modules can be placed on the target surface.

Advantageously, the optimization engine is capable of programmatically identifying an optimized configuration of solar modules for use within a solar power system to be installed on a given target surface, thereby greatly improving the potential performance of that solar power system. Furthermore, since the optimization engine is computer-implemented, the configuration process is significantly more expedient and less costly than traditional manually-performed techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for determining a full configuration of a solar power system, the method comprising:
   projecting, by a processing unit, a first plurality of potential solar module configurations onto a target surface comprising a first region, wherein each potential solar module configuration comprises a plurality of solar modules, and wherein the first region of the target surface is identified by a first identification function applied to a tiled reference grid only, the first identification function comprising:
   projecting onto the target surface the tiled reference grid comprising an array of tiles having rectangular shapes;
   culling tiles from the tile grid that do not meet a set of tile construction requirements to produce a first set of tiles;
   generating a performance estimate for each tile in the first set of tiles;
   culling tiles from the first set of tiles that do not meet a set of tile performance requirements to produce a second set of tiles; and
   identifying a region of contiguous tiles within the second set of tiles, the region of contiguous tiles being the first region of the target surface; and
   identifying, via the processing unit, by applying a second identification function to the plurality of potential solar module configurations, a first optimal solar module configuration having an optimal performance estimate for the first region of the target surface, wherein the full configuration of the solar power system comprises at least the first optimal solar module configuration.

2. The computer-implemented method of claim 1, wherein the second identification function comprises:
   projecting onto the target surface a solar module grid comprising solar modules;
   culling solar modules from the solar module grid that do not meet a set of solar module construction requirements and culling solar modules from the solar module grid that are not contained within the first region of the target surface to produce one potential solar module configuration;
   repeating the projecting and culling steps while varying at least one of a module grid type and a projection location to produce the first plurality of potential solar module configurations; and
   generating a performance estimate for each one of the first plurality of potential solar module configurations, wherefrom the first optimal solar module configuration is identified.

3. The computer-implemented method of claim 1, further comprising:
   projecting a second plurality of potential solar module configurations onto the target surface comprising a second region not covered by the first solar module configuration, wherein each potential solar module configuration of the second plurality comprises a second plurality of solar modules, and wherein the second region of the target surface is identified by a third identification function applied to a set of tiles only; and
   identifying, by applying a fourth identification function to the second plurality of potential solar module configurations, a second optimal solar module configuration having an optimal performance estimate for the second region of the target surface, wherein the full configuration of the solar power system further comprises the second optimal solar module configuration.

4. The computer-implemented method of claim 3, wherein the third identification function comprises:
   receiving a set of tiles that represents at least a portion of the target surface;
   excluding tiles associated with the first optimal solar module configuration from additional processing to create a first subset of tiles;
   culling tiles from the first subset of tiles that do not meet a set of tile construction requirements to produce a second subset of tiles; and
   identifying a subregion of contiguous tiles within the second subset of tiles being the second region of the target surface.

5. The computer-implemented method of claim 3, wherein the fourth identification function comprises:
   projecting onto the target surface a solar module subgrid comprising an array of rectangular solar modules;
   culling solar modules from the solar module subgrid that do not meet a set of solar module construction requirements to produce a first subset of solar modules;
   repeating the projecting and culling steps while varying at least one of a module grid type and a projection location to produce the second plurality of potential solar module configurations; and
   generating a performance estimate for each potential configuration of the second plurality of potential solar module configurations, wherefrom the second optimal solar module configuration is identified.

6. The computer-implemented method of claim 3, wherein an estimated performance of a potential solar module configuration in at least one of the first plurality of potential solar module configurations and the second plurality of potential solar module configurations is based on one or more of (i) a location and/or orientation of the target surface, (ii) a solar module type within the potential solar module configuration, (iii) a utility rate corresponding to the location of the target surface, (iv) an amount of irradiance and/or net shading associated with each solar module within the potential solar module configuration, (v) historical weather data, and (vi) power flow simulators that account for module electrical wiring and topology.

7. The computer-implemented method of claim 3, wherein each solar module of at least one of the first plurality of solar modules and the second plurality of solar modules is disposed according to either a landscape orientation or a portrait orientation.

8. A non-transitory computer-readable medium storing program instructions that, when executed by a processing unit, cause the processing unit to determine a full configuration of a solar power system by performing the steps of:
projecting a first plurality of potential solar module configurations onto a target surface comprising a first region, wherein each potential solar module configuration comprises a plurality of solar modules, and wherein the first region of the target surface is identified by a first identification function applied to a tiled reference grid only, the first identification function comprising:
projecting onto the target surface the tiled reference grid comprising an array of tiles having rectangular shapes;
culling tiles from the tile grid that do not meet a set of tile construction requirements to produce a first set of tiles;
generating a performance estimate for each tile in the first set of tiles;
culling tiles from the first set of tiles that do not meet a set of tile performance requirements to produce a second set of tiles; and
identifying a region of contiguous tiles within the second set of tiles, the region of contiguous tiles being the first region of the target surface; and
identifying, by applying a second identification function to the plurality of potential solar module configurations, a first optimal solar module configuration having an optimal performance estimate for the first region of the target surface, wherein the full configuration of the solar power system comprises at least the first optimal solar module configuration.

9. The non-transitory computer-readable medium of claim 8, wherein the second identification function comprises:
projecting onto the target surface a solar module grid comprising an array of rectangular solar modules;
culling solar modules from the solar module grid that do not meet a set of solar module construction requirements and culling solar modules from the solar module grid that are not contained within the first region of the target surface to produce one potential solar module configuration;
repeating the projecting and culling steps while varying at least one of a module grid type and a projection location to produce the first plurality of potential solar module configurations;
generating a performance estimate for each one of the first plurality of potential solar module configurations, wherefrom the first optimal solar module configuration is identified.

10. The non-transitory computer-readable medium of claim 8 storing program instructions that, when executed by a processing unit, cause the processing unit to determine a full configuration of a solar power system by further performing the steps of:
projecting a second plurality of potential solar module configurations onto the target surface comprising a second region not covered by the first solar module configuration, wherein each potential solar module configuration of the second plurality comprises a second plurality of solar modules, and wherein the second region of the target surface is identified by a third identification function applied to a set of tiles only; and
identifying, by applying a fourth identification function to the second plurality of potential solar module configurations, a second optimal solar module configuration having an optimal performance estimate for the second region of the target surface, wherein the full configuration of the solar power system further comprises the second optimal solar module configuration.

11. The non-transitory processor-readable medium of claim 10, wherein the third identification function comprises:
receiving a set of tiles that represents at least a portion of the target surface;
excluding tiles associated with the first optimal solar module configuration from additional processing to create a first subset of tiles;
culling tiles from the first subset of tiles that do not meet a set of tile construction requirements to produce a second subset of tiles; and
identifying a subregion of contiguous tiles within the second subset of tiles being the second region of the target surface.

12. The non-transitory computer-readable medium of claim 10, wherein the fourth identification function comprises:
projecting onto the target surface a solar module subgrid comprising an array of rectangular solar modules;
culling solar modules from the solar module subgrid that do not meet a set of solar module construction requirements to produce a first subset of solar modules;
repeating the projecting and culling while varying at least one of a module grid type and a projection location to produce the first plurality of potential solar module configurations; and
generating a performance estimate for each potential configuration of the second plurality of potential solar module configurations, wherefrom the second optimal solar module configuration is identified.

13. The non-transitory computer-readable medium of claim 10, wherein an estimated performance of a potential solar module configuration in at least one of the first plurality of potential solar module configurations and the second plurality of potential solar module configurations is based on one or more of (i) a location and/or orientation of the target surface, (ii) a solar module type within the potential solar module configuration, (iii) a utility rate corresponding to the location of the target surface, (iv) an amount of irradiance and/or net shading associated with each solar module within the potential solar module configuration, (v) historical weather data, and (vi) power flow simulators that account for module electrical wiring and topology.

14. The non-transitory computer-readable medium of claim 10, wherein each solar module of at least one of the first plurality of solar modules and the second plurality of solar modules is disposed according to either a landscape orientation or a portrait orientation.

15. A computing device configured to determine a full configuration of a solar power system, comprising a processing unit configured to:
project a first plurality of potential solar module configurations onto a target surface comprising a first region, wherein each potential solar module configuration comprises a plurality of solar modules, and wherein the first region of the target surface is identified by a first identification function applied to a tiled reference grid only, the first identification function comprising:

projecting onto the target surface the tiled reference grid comprising an array of tiles having rectangular shapes;

culling tiles from the tile grid that do not meet a set of tile construction requirements to produce a first set of tiles;

generating a performance estimate for each tile in the first set of tiles:

culling tiles from the first set of tiles that do not meet a set of tile performance requirements to produce a second set of tiles; and identifying a region of contiguous tiles within the second set of tiles, the region of contiguous tiles being the first region of the target surface; and identify, by applying a second identification function to the plurality of potential solar module configurations, a first optimal solar module configuration having an optimal performance estimate for the first region of the target surface, wherein the full configuration of the solar power system comprises at least the first optimal solar module configuration.

16. The computing device of claim 15, wherein the second identification function comprises:

projecting onto the target surface a solar module grid comprising solar modules;

culling solar modules from the solar module grid that do not meet a set of solar module construction requirements and culling solar modules from the solar module grid that are not contained within the first region of the target surface to produce one potential solar module configuration;

repeating the projecting and culling steps while varying at least one of a module grid type and a projection location to produce the first plurality of potential solar module configurations;

generating a performance estimate for each one of the first plurality of potential solar module configurations, wherefrom the first optimal solar module configuration is identified.

17. The computing device of claim 15, the processing unit further configured to:

project a second plurality of potential solar module configurations onto the target surface comprising a second region not covered by the first solar module configuration, wherein each potential solar module configuration of the second plurality comprises a second plurality of solar modules, and wherein the second region of the target surface is identified by a third identification function applied to a set of tiles only; and identify, by applying a fourth identification function to the second plurality of potential solar module configurations, a second optimal solar module configuration having an optimal performance estimate for the second region of the target surface, wherein the full configuration of the solar power system further comprises the second optimal solar module configuration.

18. The computing device of claim 17, wherein the third identification function comprises:

receiving a set of tiles that represents at least a portion of the target surface;

excluding tiles associated with the first optimal solar module configuration from additional processing to create a first subset of tiles;

culling tiles from the first subset of tiles that do not meet a set of tile construction requirements to produce a second subset of tiles; and identifying a subregion of contiguous tiles within the second subset of tiles being the second region of the target surface.

19. The computing device of claim 17, wherein the fourth identification function comprises:

projecting onto the target surface a solar module subgrid comprising an array of rectangular solar modules;

culling solar modules from the solar module subgrid that do not meet a set of solar module construction requirements to produce a first subset of solar modules;

repeating the projecting and culling while varying at least one of a module grid type and a projection location to produce the first plurality of potential solar module configurations;

generating a performance estimate for each potential configuration of the second plurality of potential solar module configurations, wherefrom the second optimal solar module configuration is identified.

20. A solar power configuration system, comprising:

a database of target surfaces generated from satellite images;

a renderer, communicatively coupled to the database, that obtains at least one target surface from the database and projects a plurality of potential solar module configurations onto the obtained target surface, wherein each potential solar module configuration comprises a plurality of solar modules, and wherein the obtained target surface is identified by an identification function applied to a tiled reference grid only, the identification function comprising:

projecting onto the target surface the tiled reference grid comprising an array of tiles having rectangular shapes;

culling tiles from the tile grid that do not meet a set of tile construction requirements to produce a first set of tiles;

generating a performance estimate for each tile in the first set of tiles:

culling tiles from the first set of tiles that do not meet a set of tile performance requirements to produce a second set of tiles; and identifying a region of contiguous tiles within the second set of tiles, the region of contiguous tiles being the first region of the target surface; and a solar power optimization tool, communicatively coupled to the renderer, that calculates a performance score for each of the plurality of potential solar module configurations and automatically identifies an optimal solar module configuration from the plurality of potential solar module configurations based on the performance score.

21. A system for determining a configuration of a solar power system, the system comprising:

means for receiving data that represents a 3D structure, the 3D structure comprising a target surface;

means for defining a contiguous region of the target surface with an identification function applied to a tiled reference grid only, the identification function comprising:

projecting onto the target surface the tiled reference grid comprising an array of tiles having rectangular shapes;

culling tiles from the tile grid that do not meet a set of tile construction requirements to produce a first set of tiles;

generating a performance estimate for each tile in the first set of tiles:

culling tiles from the first set of tiles that do not meet a set of tile performance requirements to produce a second set of tiles; and identifying a region of contiguous tiles within the second set of tiles, the region of contiguous tiles being the first region of the target surface;

means for projecting a plurality of potential solar module configurations on the contiguous region of the target surface, wherein each potential solar module configuration comprises a plurality of solar modules; and means for identifying the configuration of the solar power system from among the plurality of potential solar module configurations having an optimal solar module configuration.

* * * * *